United States Patent
Oud et al.

(10) Patent No.: US 12,117,169 B2
(45) Date of Patent: Oct. 15, 2024

(54) BURNER SYSTEM FOR A STEAM CRACKING FURNACE

(71) Applicant: TECHNIP FRANCE, Courbevoie (FR)

(72) Inventors: Peter Oud, Zoetermeer (NL); Unal Kinik, Zoetermeer (NL)

(73) Assignee: TECHNIP FRANCE, Courbevoie (FR)

( * ) Notice: Subject to any disclaimer, the term of this patent is extended or adjusted under 35 U.S.C. 154(b) by 0 days.

(21) Appl. No.: 17/050,387

(22) PCT Filed: Apr. 26, 2019

(86) PCT No.: PCT/EP2019/060731
§ 371 (c)(1),
(2) Date: Oct. 23, 2020

(87) PCT Pub. No.: WO2019/207105
PCT Pub. Date: Oct. 31, 2019

(65) Prior Publication Data
US 2021/0048193 A1 Feb. 18, 2021

(30) Foreign Application Priority Data
Apr. 26, 2018 (EP) ..................................... 18169521

(51) Int. Cl.
| | |
|---|---|
| F23D 14/64 | (2006.01) |
| C10G 9/36 | (2006.01) |
| F23C 9/08 | (2006.01) |
| F23L 7/00 | (2006.01) |

(52) U.S. Cl.
CPC .............. *F23D 14/64* (2013.01); *C10G 9/36* (2013.01); *F23C 9/08* (2013.01); *F23L 7/007* (2013.01); *F23C 2202/10* (2013.01)

(58) Field of Classification Search
None
See application file for complete search history.

(56) References Cited

U.S. PATENT DOCUMENTS

| | | | |
|---|---|---|---|
| 5,098,282 A | * | 3/1992 | Schwartz ................ F23D 14/20 |
| | | | 431/9 |
| 5,413,477 A | | 5/1995 | Moreland |
| 6,383,461 B1 | | 5/2002 | Lang |

(Continued)

FOREIGN PATENT DOCUMENTS

| | | |
|---|---|---|
| CN | 109073212 A | 12/2018 |
| EP | 1495262 B1 | 4/2015 |

(Continued)

OTHER PUBLICATIONS

Sreenivas, Jayanti, "Bends, FLow and Pressure Drop in" (2011), https://www.thermopedia.com/content/577/ (Year: 2011).*

(Continued)

*Primary Examiner* — Jason Lau
(74) *Attorney, Agent, or Firm* — Locke Lord LLP; Christopher J. Capelli; Gabrielle L. Gelozin

(57) ABSTRACT

Burner system for a radiant section of a steam cracking furnace configured to provide heat to the radiant section, the burner system including a fuel inlet and an oxidant inlet, and further comprising an ejector block arranged located within the radiant section and to receive a propellant and a propelled fluid and arranged to premix said propellant with said propelled fluid.

23 Claims, 7 Drawing Sheets

(56) References Cited

U.S. PATENT DOCUMENTS

| | | | |
|---|---|---|---|
| 6,383,462 B1* | 5/2002 | Lang | F23L 7/005 |
| | | | 423/235 |
| 6,450,800 B1* | 9/2002 | Cash | F23D 14/64 |
| | | | 431/11 |
| 2003/0175646 A1 | 9/2003 | Stephens et al. | |
| 2009/0120338 A1 | 5/2009 | Adendorff et al. | |
| 2009/0178814 A1* | 7/2009 | Heisel | A62C 3/04 |
| | | | 169/46 |
| 2010/0301274 A1* | 12/2010 | Gallarda | B01J 8/062 |
| | | | 252/373 |
| 2015/0153040 A1* | 6/2015 | Rivera Garza | F23D 14/62 |
| | | | 239/427 |
| 2017/0283713 A1* | 10/2017 | Stephens | F23C 5/00 |

FOREIGN PATENT DOCUMENTS

| | | | |
|---|---|---|---|
| JP | 2005521024 A | 7/2005 | |
| WO | 03/081131 A1 | 10/2003 | |

OTHER PUBLICATIONS

International search report and Written Opinion dated May 17, 2019 issued in corresponding PCT application PCT/EP2019/060731.
Japanese Office Action dated Sep. 27, 2022, issued in corresponding Japanese Application No. 2020-559469, and machine translation.

* cited by examiner

BURNER SYSTEM FOR A STEAM CRACKING FURNACE

CROSS-REFERENCE TO RELATED APPLICATIONS

This application is a U.S. National Stage application under 35 U.S.C. 371 of International Application No. PCT/EP2019/060731 filed on Apr. 26, 2019, which claims priority to and the benefit of EP Application No. 18169521.4, filed Apr. 26, 2018 in the European Patent Office. The entire contents of these applications are incorporated herein by reference in their entirety.

The invention relates to a burner system for a steam cracking furnace.

In a conventional steam cracking furnace, hydrocarbon feedstock can enter a feed preheater, one of the many convection banks in the convection section of a cracking furnace. This hydrocarbon feedstock can be any kind of hydrocarbons, preferably paraffinic or naphthenic in nature, but small quantities of aromatics and olefins can also be present. Examples of such feedstock are: ethane, propane, butane, natural gasoline, naphtha, kerosene, natural gas condensate, gas oil, vacuum gas oil, hydrotreated or desulphurized or hydrodesulphurized (vacuum) gas oils or combinations thereof. Depending on the state of the feedstock the feed can be preheated and/or partly or fully be evaporated in the feed preheater before being mixed with dilution steam. Dilution steam can be injected directly, or it can be superheated first in a dilution steam superheater before being mixed with the feedstock. There can also be multiple steam injection points, for example for heavier feedstock. The mixed feedstock/dilution steam mixture is further heated in high temperature coils to reach an optimum temperature for introduction in a radiant coil. In the radiant coil the hydrocarbon feedstock is quickly heated up to the point where the pyrolysis reaction starts and the hydrocarbon feedstock is converted into products and by-products. Such products are amongst others hydrogen, ethylene, propylene, butadiene, benzene, toluene, styrene and xylenes. By-products are amongst others methane and fuel oil. The resulting mixture of dilution steam, unconverted feedstock and converted feedstock, the reactor effluent, is called "cracked gas". This cracked gas is cooled quickly in a transfer line exchanger, to freeze the equilibrium of the reactions in favour of the products. The waste heat in the cracked gas can be recovered in at least one transfer line exchanger and can be used to generate saturated high pressure (HP) steam. This steam may be generated from boiler water coming from a steam drum. In the transfer line exchanger the boiler water is partly vaporized. This partly vaporized boiler water is flowing back to the steam drum by natural circulation. In the steam drum the generated saturated steam is separated from the boiler water and may be sent to the convection section to be superheated. There can be multiple transfer line exchangers, but the first one, the primary transfer line exchanger is preferably used to generate saturated steam.

The heat of reaction for the highly endothermic pyrolysis reaction may be supplied by combustion of fuel (gas) with combustion air in the furnace firebox, also called radiant section, by means of bottom burners and/or side wall burners. Other firing options are possible as well. It is advantageous for run length to distribute the heat as evenly as possible in the firebox. Generally speaking, bottom burners have relatively long combustion zones or flames, as the number of bottom burners is restricted. Side wall burners are usually higher in number but their combustion zones or flames are smaller. Furnace efficiency is highly dependent on the heat release pattern of the bottom burners and the physical location of the side wall burners: the more the bottom burners release heat in the lower regions of the furnace firebox and the lower elevation of the side wall burners in the firebox, the better can be the furnace efficiency. In the combustion zones fuel and air are converted to combustion products, such as water and $CO_2$, the so-called "flue gas". The waste heat from the flue gas is recovered in the convection section using various types of convection banks. Part of the heat is used for the process side, the preheat and/or evaporation of the hydrocarbon feed and the dilution steam, and the rest of the heat is used for the non-process side, such as the generation of HP steam. To recover excess waste heat from the flue gas as described above by generating HP steam, boiler feed water may be heated up in an economizer in the convection section before being delivered to the steam drum. In the steam drum it may be mixed with the boiler water already present. As described above, the boiler water can be used in the transfer line exchanger to generate steam. Saturated steam may be sent to the convection section, where it can be superheated by high pressure steam superheaters. To control the HP steam temperature, boiler feed water may be injected in a desuperheater.

A problem with the state-of-the-art steam cracking furnaces is that the firebox dimensions are increasingly affected by NOx production, production of nitrous oxides, such as NO and $N_2O$, which is an unwanted combustion by-product which may for example cause acid rain. As the NOx emission targets get more and more stringent, firebox dimensions are increased in order to more effectively cool the flame and keep the NOx emissions within authority regulation limits, which is increasing cracking furnace capital cost. At the same time, there is a tendency to increase furnace fuel-efficiency to minimize $CO_2$ emissions as these are the major source of greenhouse gases. The firebox efficiency can for example be increased by the removal of at least part of the side wall burners. Due to this tendency to increase furnace fuel efficiency, the capacity of the bottom burners needs to be increased to compensate for the removal of at least part of the side wall burners.

It is an intention of the present invention to obviate one or more of the above-mentioned problems. In particular, the present invention intends to provide a burner system for a steam cracking furnace, which can reduce NOx emissions, without the need to increase firebox dimensions.

To this aim, according to a first aspect of the present invention, there is provided a burner system characterized by the features of claim 1. In particular, there is provided a burner system for a radiant section, i.e. a furnace firebox, of a steam cracking furnace configured to provide heat to the radiant section. The burner system includes a fuel inlet and an oxidant inlet, and the burner system further comprises an ejector block arranged to receive a propellant and a propelled fluid and arranged to premix said propellant with said propelled fluid. The ejector block is located within the radiant section, such that the ejector block, in combination with a high velocity jet of propellant, can provide a certain amount of suction on for example flue gas in the firebox, without any additional piping, thus establishing an increased recirculating flue gas flow. Flue gas generated in the combustion zone of the firebox is drawn back into the burner system via the ejector block generating a recirculating flue gas flow. The main effect of flue gas recirculation is that it reduces an adiabatic flame temperature in the firebox, the adiabatic flame temperature being the temperature of the flue gas produced by the combustion before it releases any heat to its environment. This is due to an intense premixing of flue gas with fuel and/or oxidant at relatively low temperature, prior to the final combustion. This means that in a main combustion zone of the radiant section more of the heat of combustion has to be allocated to reheat the recirculated inert flue gas, leaving less heat available to heat up the nett combustion products, thus reducing the adiabatic flame temperature. The higher the recirculation rate the lower the adiabatic flame temperature, thus limiting the maximum temperature of the flame in the firebox, which in turn can reduce the production of nitrous oxides, such as NO and N2O, so called NOx, which is an unwanted combustion by-product mostly produced in regions with a temperature in excess of 1700° C. The burner system comprises a single outlet into the radiant section for an outlet flow of the at least partly unconverted mixture of fuel and/or oxidant combined with a propellant/propelled fluid pre-mixture. The propellant can for example be compressed fuel or compressed oxidant. The propelled fluid may be flue gas containing oxygen. The outlet flow may for example be a premixed flue gas/fuel mixture or for example a premixed flue gas/oxidant mixture, where the fuel is partly converted before leaving the burner, or in other words, the outlet flow may for example be at least partly converted fuel with excess oxidant, where either at least part of the fuel or at least part of the oxidant is premixed intensely with recirculated flue gas to reduce the adiabatic flame temperature in the main combustion zone of the radiant section. A burner system having a single outlet flow into the radiant section can do away with further secondary air gaps for an outlet flow of air into the radiant section, which are generally present in prior art burner systems. Many configurations of the burner system are possible. The burner system can for example, but need not, comprise a burner block including the fuel inlet and/or the oxidant inlet. The ejector block can then be placed such as to eject the at least partly unconverted propellant/propelled fluid into the burner block. Alternatively, the ejector block can eject directly into the firebox, while the fuel and the oxidant are injected into the ejector block upstream of the single outlet of the burner system. The oxidant and/or the fuel may for example even be part of the propellant.

The ejector block can advantageously comprise an ejector of the constant area mixing type, the ejector block including an ejector constant area mixing section in which the propellant and propelled fluid are mixed, wherein the ejector constant area mixing section is at a distance from an entrance of the ejector block. Contrary to other ejector types, such as the more commonly used constant pressure mixing ejectors in which the propellant and the propelled fluid are mixed in a suction chamber at the entrance of the ejector block, the propellant and the propelled fluid in this constant area mixing section type ejector are mixed at a distance from an entrance of the ejector block, in particular in what is called a throat of the ejector, improving mixing conditions of the propellant and propelled fluid. In the constant area mixing device the propelled fluid is first being accelerated in a suction chamber of the ejector block before being mixed with the propellant in the constant area mixing section. This minimizes the velocity difference, and corresponding momentum difference, between the propellant and the propelled fluid, making the mixing inherently more efficient than that of other ejector types where the mixing is taking place at the entrance of a suction chamber of the ejector block.

A ratio of a length of the ejector constant area mixing section over a throat inner diameter of the ejector constant area mixing section is in a range of about 5 to about 8. Sufficient length of the ejector constant area mixing section, which is also called the throat of the ejector block, can improve the transfer of the propellant jet's momentum to the propelled fluid, for example the recirculating flue gas. A propellant's velocity can go down while a propelled fluid's velocity can increase over the length of the ejector's throat or constant area mixing section. Or in other words, the velocity difference between the propellant and the propelled fluid can reduce over the length of the ejector's throat or constant area mixing section. The preferred length over throat diameter ratio between approximately 5-8 can come close to an ejector's maximum efficiency.

The ejector block can preferably comprise a suction chamber arranged to suck in the propelled fluid, such as flue gas present in the firebox, wherein the suction chamber is arranged to increase a momentum of the propelled fluid, in particular of the flue gas. The suction chamber is located at an entrance of the ejector block. The design of the suction chamber is such that a momentum of the incoming propelled fluid, such as flue gas, is gradually increased to reduce mixing losses and to increase ejector efficiency. The suction chamber can for example have a converging shape towards the constant area mixing section. An inner wall of the suction chamber can preferably be rounded off from an entrance of the ejector block towards the throat of the ejector block, such that the suction chamber of the ejector block for example has a substantially bell-like shape. As a result of the propelled fluid being sucked into the ejector block by for example a bell-like shaped suction chamber at the entrance of the ejector block, the flow direction of the propelled fluid is substantially in line with a longitudinal axis of the ejector block, which can improve efficiency of momentum transfer between the propellant and the propelled fluid in the mixing section of the ejector block. This is contrary to some prior art suction chambers, in which the flow direction of the propelled fluid is substantially transverse to the flow direction of the propellant, which reduces the ejector efficiency due to mixing losses.

The burner system can further comprise a first nozzle configured to inject the propellant into the ejector block, wherein the nozzle extends into the ejector block, in particular into the suction chamber, along a longitudinal axis of the ejector block, preferably along a longitudinal and central axis. As the first nozzle extends into the ejector block, the propellant is injected into the ejector block at a location which is spaced-apart from the entrance of the ejector block where the propelled fluid enters the ejector block, in particular at a location behind the entrance of the ejector block as seen in a longitudinal direction of the ejector block. By injecting the propellant into the ejector block in a longitudinal direction of the ejector block instead of being injected for example in a direction which is transverse to a longitudinal axis of the ejector block, mixing of the propelled fluid and the propellant can be improved as the velocity of both fluids are in the same direction.

The first nozzle can advantageously be located at an entrance of the ejector constant-area mixing section, which is in direct fluid connection with the suction chamber of the ejector block. In this way, combustion in the suction chamber at the entrance of the ejector block can be avoided, preventing chocking of the ejector. Additionally, a more efficient ejector block can be provided, especially being capable in handling heterogeneous or non-homogeneous fluids, such as a relatively cold propellant, for example fuel, and a relatively hot propelled fluid, for example recirculating flue gas. The propellant and the propelled fluid can for example have different physical and thermodynamic properties. More specifically, molecular weight, temperature, heat capacity and isentropic factor can be different.

It is preferred that a ratio of a throat inner diameter of the ejector constant area mixing section over a diameter of the first nozzle is higher than 5, preferably higher than 7, more preferably around 10. This ratio can determine the amount of propelled fluid, for example recirculating flue gas, that is sucked into the ejector. The higher this diameter ratio, the higher is the percentage of recirculated flue gas, and the lower is the resulting adiabatic flame temperature in the firebox, and thus the NOx emission.

The ejector block can advantageously comprise an ejector diffuser configured to transfer dynamic pressure into static pressure. This transfer of dynamic pressure into static pressure can provide an improved combustion in the firebox, as explained hereafter.

It is desirable to maximize the ejector's thrust augmentation, which is the increase of the thrust of the ejector over that of an ordinary nozzle. Thrust is the kinetic energy of the gas stream. This can for example be achieved by optimization of the ratio of the diffuser exit area over the throat area. Detailed studies of ejectors have shown that this thrust augmentation is at its maximum when a ratio of an ejector diffuser exit area over an ejector diffuser inlet area is preferably included in a range of about 1.5 to about 2.5, more preferably around 2.3. With an area ratio of 1, there is no conversion of dynamic pressure into static pressure. The outlet velocity of the diffuser is the same as that out of the throat for the obvious reason that the diameters are the same. There is no pressure recovery, resulting in a relatively low throughput. With very high area ratios, all of the dynamic pressure is converted into static pressure. The outlet velocity of the diffuser is much lower than that out of the throat. Pressure recovery is very high, resulting in a high throughput, but velocity and consequently the thrust is very low. Going from an area ratio of 1 to an area ratio of infinity, the thrust goes through a maximum. To maximize the thrust out of the diffuser, both throughput and velocity need to be relatively high. This thrust can improve the mixing of the at least partly unconverted mixture of premixed propelled fluid/propellant and/or fuel, for example a premixed and at least partly unconverted fuel gas/flue gas mixture, with a low velocity oxidant, for example coming in through a windbox connected to a burner block. The higher the thrust, the better the mixing, which can enhance proper combustion in the main combustion zone of the firebox.

The propellant may for example be one of compressed fuel gas, compressed air, and compressed combustion oxygen, or even a combination of any of these. For each of these examples of propellant, the propelled fluid is preferred to be flue gas. Using fuel gas as the propellant may be advantageous as it is already present in compressed form at the furnace. Also, compressed air is available in every plant, for example for decoking. The required quantity of compressed air as propellant being limited, it has the advantage over compressed fuel gas that a supply pressure of the air can be set independently from plant operating conditions to meet NOx limitations, which is not possible with the fuel gas pressure. It may also be possible to use pure oxygen as propellant and raise firebox efficiency, while using normal air for the main flame, which can increase fuel efficiency while maintaining the same NOx emission levels. The use of compressed air as propellant can provide some additional advantages. Due to the absence of a combustible mixture in the ejector itself, there is no chance of overheating the ejector during the start-up phase, when the excess oxidant is high in the firebox. This means that burner can be started up with only a limited amount of primary fuel and that there is no need for secondary fuel. This means that the furnace doesn't need to be heated up to full operating condition, before the ejector can be employed, but that heating up to the so-called "hot-standby" condition, the condition before the main feedstock is introduced, could be sufficient. This so-called "hot-standby" condition is substantially colder and can reduce the start-up capacity with a factor 3-4. As the primary burner is the remaining main source of NOx formation, reducing the capacity of this burner can further reduce the NOx formation. Compressed combustion oxygen as propellant may be typically used to produce flue gas with a very low nitrogen concentration such that it is more economical in case $CO_2$ capturing is applied to reduce $CO_2$ emissions. As the nitrogen content is very low, also the NOx formation is very low, as NOx cannot be formed without nitrogen. One of the main advantages of the use of compressed combustion oxygen is that the flue gas recirculation is high enough to avoid external flue gas recirculation, which is recirculation of relatively cold flue gas via ducting to the burner from outside the firebox.

The burner system may further comprise an outlet bend piece. In case of a burner system comprising a burner block, this outlet bend piece can extend through a side wall of the burner block and bend into a flow direction of the burner block. The outlet bend piece may be in direct fluid communication with a diffuser of the burner system. The change of direction of the at least partly unconverted mixture of premixed propellant/propelled fluid can induce swirling of the mixture, again favouring mixing and improving combustion in the main combustion zone of the firebox. It is preferred that a ratio of a bend inner radius over a diameter of the outlet bend piece is preferably higher than approximately 0.75 or more preferably higher than approximately 1.0, being a relatively large bend, which can improve a cross-sectional flow distribution leaving the bend and can lower pressure drop. Too small a bend radius might give a high preferential flow towards the firebox side wall, which is unwanted.

The burner system may further comprise a straight extension piece. The straight extension piece may extend and be in direct fluid communication with an outlet bend piece or with a diffuser of the burner system. The straight extension piece may extend into a burner block of the burner system, or may extend directly into the firebox. A central longitudinal axis of the straight extension piece may be in parallel with, or even be substantially the same as, a central longitudinal axis of the burner block. The extension piece is preferably directed upwardly, so as to direct the flow of the mixture coming from the ejector block into the same direction as the heat flow in the firebox. At an exit area of the straight extension piece, the at least partly unconverted mixture of premixed propellant/propelled fluid and/or fuel may for example arrive in the burner block, in which there is a flow of an oxidant, such as air. The at least partly unconverted mixture of premixed propellant/propelled fluid and/or fuel may for example be a partly converted fuel gas/flue gas mixture or other mixtures as explained further. The relatively high thrust difference between the at least partly unconverted mixture of premixed propellant/propelled fluid and/or fuel and the oxidant, for example air, in the surrounding duct of the burner block may cause the stream of oxidant to be sucked into the at least partly unconverted mixture of premixed propellant/propelled fluid stream, further aiding combustion in the main combustion zone of the firebox. It is preferred that a ratio of a length of the extension piece over a diameter of the extension piece is preferably higher than approximately 1, more preferably higher than approximately around 1.5. As indicated above there may be a certain amount of preferential flow towards the firebox side wall, which can be counteracted by making this piece longer.

An inside of a straight extension piece exit area can preferably be tapered into a sharp edge. The sharp edge can cause formation of eddies at the interface between a stream leaving the straight extension piece and a stream in a burner block, promoting mixing and subsequent combustion in the main combustion zone of the firebox.

The burner system can advantageously comprise a plurality of ejector blocks placed in parallel, each of the ejector blocks ejecting in a single burner block. Multiple ejectors can increase the duty per burner, while the required hardware, the burner block and the windbox, are only marginally more expensive. So, a more economical system can be obtained by adding as many ejectors as possible in a single burner block. As a consequence, the capacity of the system is increased. This may be advantageous in case we want to transfer duty from side wall burners of a firebox to the bottom burners and thus increase the fuel efficiency. Alternatively, a plurality of burner systems without burner block can be placed in parallel in a single firebox.

An aspect of the invention provides a furnace firebox of a steam cracking furnace as defined by the features of claim 14. This furnace firebox can provide one or more of the above-mentioned advantages.

A further aspect of the invention provides a use of the burner system in a radiant section of a steam reformer, as defined by the features of claim 15. This use can provide one or more of the above-mentioned advantages.

A yet further aspect of the invention provides a method of operating a burner system as defined by the features of claim 16. This method can provide one or more of the above-mentioned advantages. Additionally, said method of operating a burner system can prevent damage to the ejector block which could be caused by a temperature becoming too high in the ejector block. If a propellant were injected into the ejector block at start-up of the firebox, when the oxygen content or excess oxidant level in the firebox would still be above 30 vol %, without supply of primary fuel, then predominantly $CO_2$ would be produced in the pre-combustion zone as a result of exothermic reactions, especially in case of secondary fuel gas being used as propellant. This production of $CO_2$ could cause the temperature to rise in the ejector block, which might damage the ejector block. In order to prevent this potentially dangerous rise in temperature in the ejector block, according to the present method, a primary fuel is first injected into the burner system, in particular in a way bypassing the ejector block, until reaching an excess oxidant level, in particular oxygen, below approximately 30 vol % in the firebox. A supply of primary fuel can then be decreased and a propellant, for example secondary fuel, can be injected into the ejector block. As a result of the reduced oxygen content in the firebox, endothermic reactions in the pre-combustion zone can predominantly produce CO, which can keep the temperature in the ejector block under control or may even cause the temperature in the ejector block to decrease.

The present invention will be further elucidated with reference to figures of exemplary embodiments. Corresponding elements are designated with corresponding reference signs.

Figure 1:
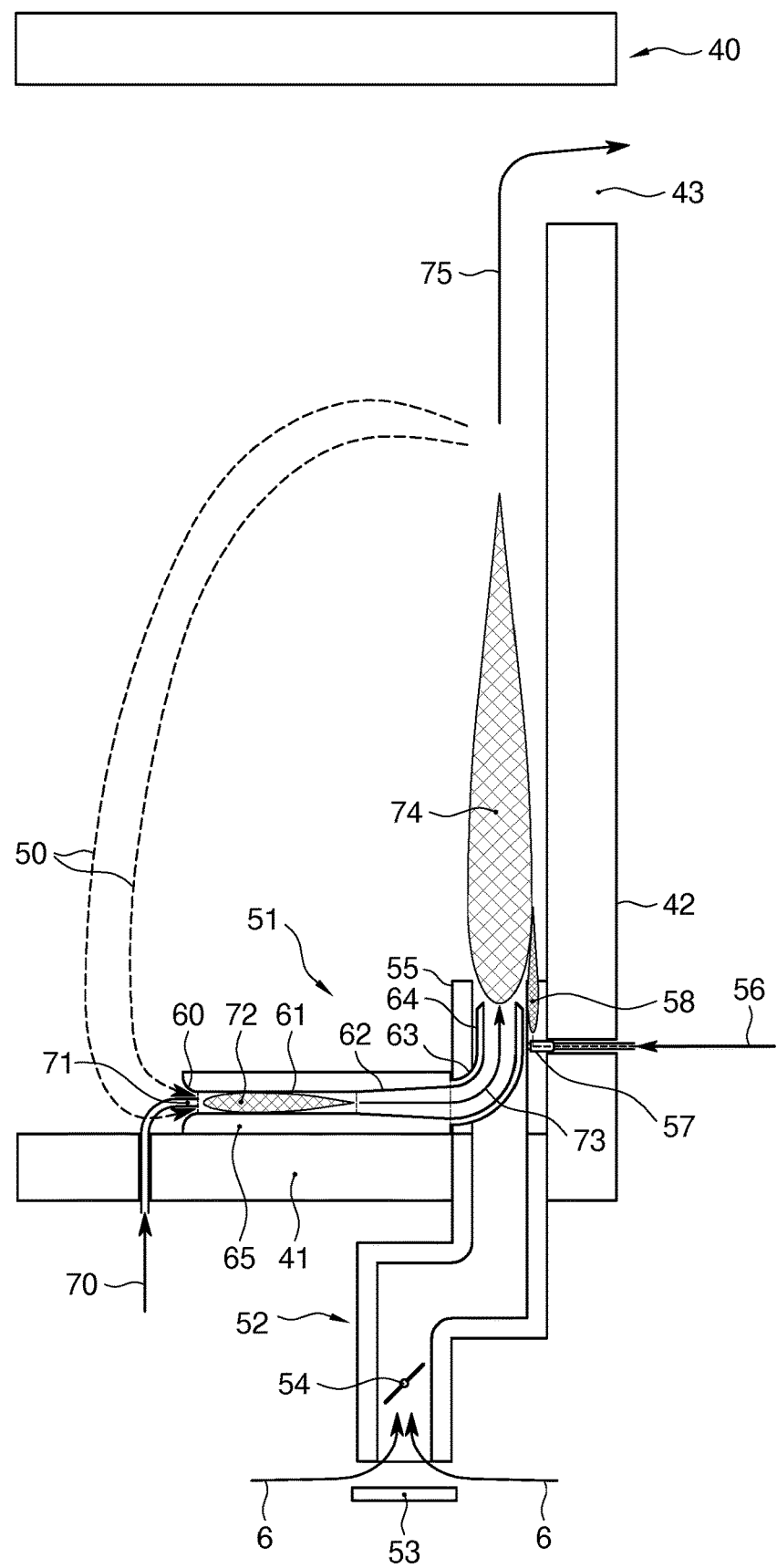
FIG. 1 shows a schematic representation of a first embodiment of a burner system according to the invention.

FIG. 1 shows a schematic representation of a first embodiment of a burner system 51 according to the invention. The burner systems shown in the following examples are preferably meant for a radiant section or firebox 40 of a steam cracking furnace although the systems can be used for other types of furnaces as well. The burner system 51 comprises a burner block 55 including a primary fuel inlet 57 and an oxidant inlet 6, for example via a windbox 52 reaching up to the firebox floor 41. The windbox 52 may for example be provided with a flange and be fixed to the bottom of the firebox floor 41. The burner system 51 further comprises an ejector block 65 arranged to receive and premix a propellant and a propelled fluid and eject a partly unconverted mixture into the burner block 55. The ejector block 65 located within the radiant section in a firebox for a steam cracking furnace can for example be located in a bottom area of the firebox, for example substantially horizontally on the furnace floor 41. Alternatively, in furnaces with down firing fireboxes, such as reformers, the burner system can also be hanging from a roof of a firebox, as will be clear to the person skilled in the art. The ejector block 65 shown in FIG. 1 is placed substantially transverse to a longitudinal and upward direction of the burner block 55, and reaches through a side wall of the burner block 55. In this way, the burner system comprises a single outlet into the radiant section or firebox 40 for an outlet flow of the at least partly unconverted mixture of fuel and/or oxidant combined with a propellant/propelled fluid pre-mixture. The ejector block 65 of the first embodiment of the burner system 51 comprises an ejector of the constant area mixing type, the ejector block 65 including an ejector constant area mixing section 61 in which propellant 70 and propelled fluid 50 are mixed. The ejector constant area mixing section 61 is at a distance from an entrance 60 of the ejector block 65, the entrance being formed by a suction chamber 60 arranged to suck in the propelled fluid 50, such as flue gas. The suction chamber 60 is arranged to increase a momentum of said propelled fluid 50. The propelled fluid 50 is first being accelerated in the suction chamber 60 in a longitudinal direction of the ejector block before being mixed with the propellant 70 in the constant area mixing chamber 61. This minimizes the velocity difference, and corresponding momentum difference, between the propellant 70 and the propelled fluid 50, making the mixing inherently more efficient than that of other ejector types where the mixing is taking place at the entrance of the suction chamber 60. The burner system 51 further comprises a first nozzle 71 configured to inject the propellant 70 into the ejector block 65. The nozzle 71 extends into the ejector block 65 along a longitudinal axis of the ejector block 65, preferably a longitudinal central axis of the ejector block, in particular a longitudinal central axis of the hollow ejector space within the ejector block. The first nozzle 71 is preferably placed at an entrance of the ejector constant-area mixing section 61, where the propelled fluid and the propellant substantially have a same flow direction. The first nozzle 71 is fluidly connected with a propellant 70 supply, for example reaching through the firebox floor 41. The propellant 70 can for example be secondary fuel gas, or compressed air, or compressed combustion oxygen, or other suitable propellants, as will be shown in further embodiments. In the burner system 51 of the present embodiment, the ejector block 65 comprises an ejector diffuser 62 configured to transfer dynamic pressure into static pressure. The ejector diffuser 62 has a tapered shape from an inlet area in direct fluid connection with the ejector constant area mixing section 61 towards a diffuser exit area being larger than the ejector diffuser inlet area. The burner system 51 further comprises an outlet bend piece 63 connecting the ejector block 65 into the burner block 55 through a side wall of the burner block 55. The outlet bend piece 63 comprises a bend of a substantially right angle so that the mixture of propellant and propelled fluid is directed into the same direction as the flow direction of the oxidant 6 in the burner block 55. The burner system 51 further comprises a straight extension piece 64 extending into the burner block 55 in parallel with a central longitudinal axis of the burner block 55. An outer diameter of the straight extension piece 64 is smaller than any of the inner dimensions or diameters of the burner block 55 such that the oxidant, for example combustion air 6, and the primary fuel 56 can flow along the straight extension piece 64. The speed of the premixed and at least partly unconverted propellant/propelled fluid mixture leaving the straight extension piece 64 can have a suction effect on the oxidant resulting in a better mixing of both flows. This effect can be further enhanced by an inside of the straight extension piece exit area being tapered into a sharp edge.

An example of a combustion process using this first embodiment of the burner system 51 can be described as follows. An oxidant 6, such as combustion air, can enter the burner system 51 through the opening between a muffler 53 and a windbox 52. The flow rate of the oxidant can be controlled by the oxidant control damper 54 located on the windbox. The oxidant travels through the oxidant channel on the inside of the windbox through the furnace floor 41 and the inside of the burner block 55 towards the primary combustion zone 58 and the main combustion zone 74 at the outlet of the burner block.

Primary fuel gas 56 passes through the firebox side wall 42 and through the primary fuel burner nozzles 57 located in a recess in the burner block, where it enters the burner block and is ignited upon mixing with combustion air to create flue gas in the primary combustion zone 58. If only the primary burner nozzles 57 are in operation, the majority of the flue gas 75 leaves the firebox 40 through the firebox exit 43. Flue gas recirculation is very limited in this case.

A propellant, such as secondary fuel gas 70, can pass through the firebox floor 41 and through the secondary fuel burner nozzle 71 located in the entrance of the constant-area mixing section of the ejector block 61, where it enters the ejector block 65. This secondary fuel gas 70 is ignited upon mixing with recirculated flue gas 50, coming from the ejector suction chamber 60, in the pre-combustion zone 72 to create an oxygen-depleted flue gas/fuel mixture 73. The recirculated flue gas 50 is propelled into the ejector block through the ejector suction chamber 60 by the high velocity jet created at the exit of the secondary fuel gas nozzle by fuel gas, called the propellant in this context, leaving the nozzle. This recirculated flue gas 50 still contains oxygen. The remaining oxygen in this flue gas is fully converted, mostly to carbon monoxide (CO), in the pre-combustion zone 72, consuming part of the secondary fuel gas. The oxygen-depleted flue gas/fuel mixture 73 leaving the pre-combustion zone 72 is transferred through the ejector constant-area mixing section 61, the ejector diffuser 62, ejector outlet bend 63 and ejector straight extension piece 64, before leaving the ejector block 65. After leaving the extension piece, the oxygen-depleted flue gas/fuel mixture 73 is mixed with the remaining oxidant, for example combustion air 6, in the main combustion zone 74. Here all the secondary fuel is converted to flue gas 75. The produced flue gas is partly recirculated back to the suction chamber of the ejector block by the suction effect of the propellant injected into the ejector block 65, and the nett flue gas 75 is transferred to the firebox exit 43.

The primary fuel 56 and the secondary fuel 70 can both be in operation at the same time, but preferably only at start-up of the burning system, until the excess air in the firebox 40 reduces to a level of less than 30 vol %. After having reached said level, the supply of primary fuel 56 can be decreased, while the secondary fuel 70, being in operation simultaneously, may be increased. If the secondary fuel 70 were injected into the ejector block 65 at start-up of the firebox, when the oxygen content or excess oxidant level in the firebox 40 would still be above 30 vol %, without supply of primary fuel 56, then predominantly $CO_2$ would be produced in the pre-combustion zone 72 as a result of exothermic reactions. This production of $CO_2$ could cause the temperature to rise in the ejector block 65, which might damage the ejector block. In order to prevent this potentially dangerous rise in temperature in the ejector block 65, a primary fuel 56 is first injected into the burner system 51, in particular in a way bypassing the ejector block 65, until reaching an excess oxidant level, in particular an oxygen level, below approximately 30 vol % in the firebox 40. A supply of primary fuel 56 can then be decreased and secondary fuel 70 can be injected into the ejector block 65. As a result of the reduced oxygen content in the firebox, endothermic reactions in the pre-combustion zone 72 can predominantly produce CO, which can keep the temperature in the ejector block 65 under control or may even cause the temperature in the ejector block to decrease. As the combustion temperature in the main combustion zone 74 is considerably lower than in the primary combustion zone 58, less NOx is produced in the main combustion zone 74 than in the primary combustion zone 58. The smaller the percentage primary fuel, the lower the NOx emission.

Figure 2:
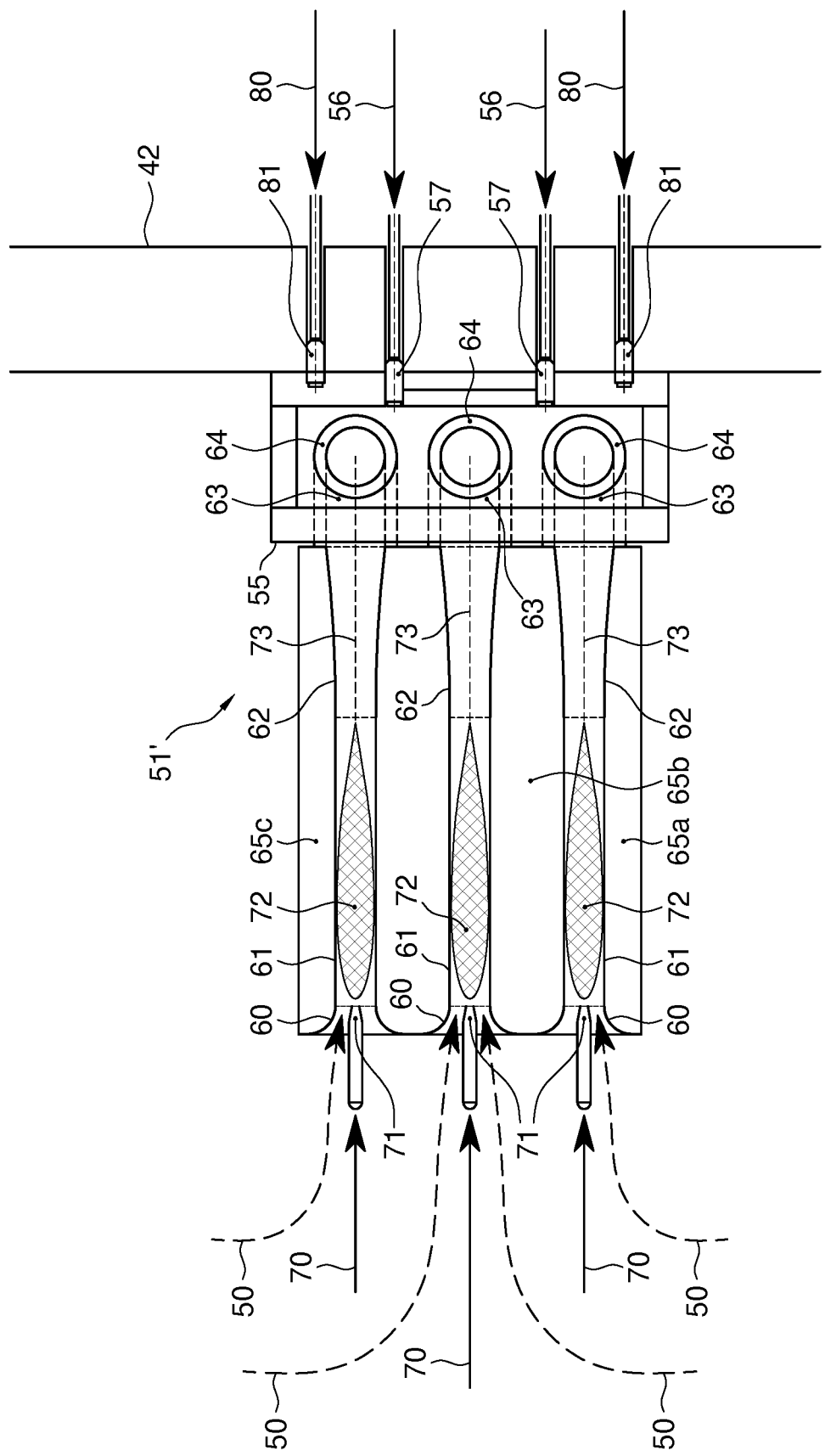
FIG. 2 shows a top view on a schematic representation of a second embodiment of a burner system according to the invention.

FIG. 2 shows a top view on a schematic representation of a second embodiment of a burner system according to the invention. The burner system 51' according to this second embodiment comprises a plurality of ejector blocks 65a, 65b, 65c placed in parallel, each of the ejector blocks ejecting into a single burner block 55. There can for example be two or three ejector blocks or more. These ejector blocks 65a, 65b, 65c can be manufactured such as to form a single block including parallel hollow ejector spaces or as separate ejector blocks. The ejector blocks can each have some or all of the features described in the previous or the following embodiments. They can preferably be placed in parallel next to each other, for example on the firebox floor 41. In addition to one or more primary fuel burner nozzles 57 extending through a firebox side wall 42 at a height of the ejector straight extension piece 64, as described in the first embodiment, the burner system can further comprise one or more staged fuel nozzles 81 on top of the burner block 55. In this way, staged fuel gas 80 can pass through the firebox side wall 42 and through the staged fuel burner nozzles 81 where the staged fuel 80 enters the firebox 40 and is ignited upon mixing with an oxidant, such as combustion air, to create flue gas in a staged combustion zone, situated above the primary combustion zone 58. Staged combustion can advantageously produce less NOx, such that also during the start-up phase NOx emissions can be reduced. In addition, by splitting the primary nozzles in a primary level and a staged level, the primary level can be sized for a smaller capacity, such that during normal operation, the staged level can be switched off and the primary fuel can run at reduced capacity. This reduced capacity would be lower than without splitting. As explained above, the primary burners are the main source of the remaining NOx emissions. Minimizing the contribution of these nozzles to the overall firing, reduces the overall NOx emissions to a minimum. This staged combustion can also be used to an advantage in the embodiment shown in FIG. 1.

Figure 3:
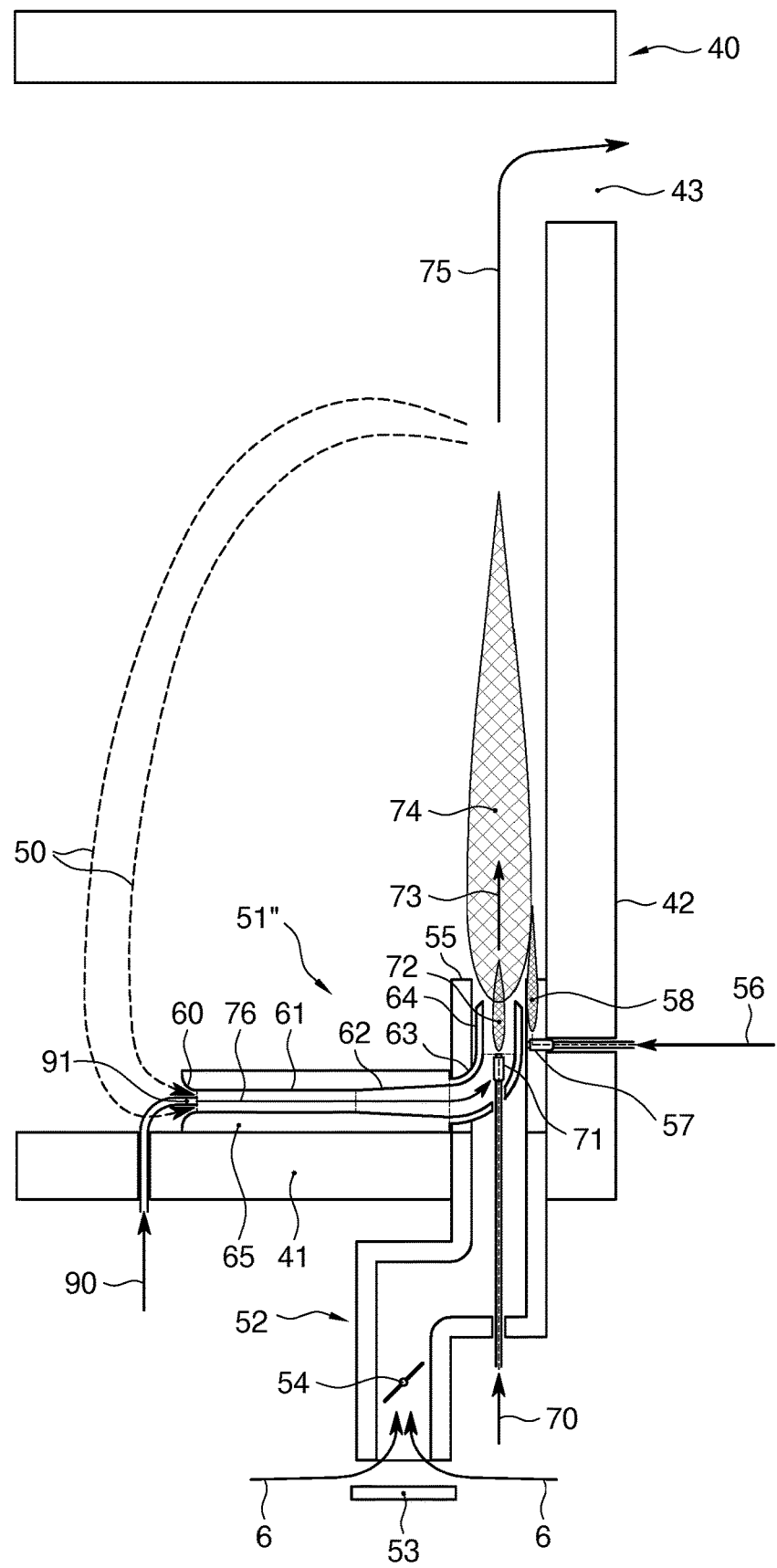
FIG. 3 shows a schematic representation of a third embodiment of a burner system according to the invention.

FIG. 3 shows a schematic representation of a third embodiment of a burner system according to the invention. The burner system according to this third embodiment can comprise one or more of the previously described features. The geometry of this burner system is substantially the same as in the first embodiment. The difference lies in the use of compressed oxidant 90, such as compressed air or even 100% pure oxygen, as propellant instead of secondary fuel gas injected by the first nozzle 91 into the ejector block 65. The burner system 51" further comprises a second nozzle 71 located near the outlet of the burner system, preferably in the ejector outlet bend piece 63, more preferably in an entrance of the ejector straight extension piece 64. The second nozzle is fluidly connected with a secondary fuel inlet extending through the ejector outlet bend piece 63 into the ejector straight extension piece 64, and preferably through a side wall of a windbox 52. In this way, excess air in the recirculating flue gas can be converted at relatively low temperature, before reaching the main combustion zone.

In a combustion process using this third embodiment of the burning system, combustion air 6 can enter the ejector burner 51" through the opening between the muffler 53 and the windbox 52, just as in the previously described embodiments. The flow rate of the air is controlled by the oxidant control damper 54 located on the windbox. The air travels through the air channel on the inside of the windbox through the furnace floor 41 and the inside of the burner block 55 towards the primary combustion zone 58 and the main combustion zone 73 at the outlet of the burner block.

Primary fuel gas 56 passes through the firebox side wall 42 and through the primary fuel burner nozzles 57 located in a recess in the burner block, where it enters the burner block 55 and is ignited upon mixing with combustion air to create flue gas in the primary combustion zone 58. If only the primary burner nozzles 57 are in operation, the majority of the flue gas 75 leaves the firebox 40 through the firebox exit 43. Flue gas recirculation is very limited in this case.

In contrast to previous embodiments, compressed air can pass through the firebox floor 41 and through the first nozzle 91 located in the entrance of the constant-area mixing section 61 of the ejector block 65, where it enters the ejector block 65. The recirculated flue gas 50 is propelled into the ejector block 65 through the ejector suction chamber 60 by the high velocity jet created at the exit of the compressed air nozzle by the compressed air, called the propellant in this context, leaving the nozzle. The flue gas/air mixture 76 is transferred through the ejector constant-area mixing section 61, the ejector diffuser 62, the ejector outlet bend 63 towards the ejector straight extension piece 64, where it is mixed with secondary fuel in the pre-combustion zone 72.

Secondary fuel gas 70 can pass through a wall of the windbox 52, the wall of the ejector outlet bend 63 and through the secondary fuel burner nozzle 71 preferably located in the entrance of the ejector straight extension piece 64, where the secondary fuel gas 70 enters the ejector block 65. This secondary fuel gas 70 is ignited upon mixing with recirculated flue gas/air mixture 76, coming from the ejector outlet bend 63, in the pre-combustion zone 72 to create an oxygen-depleted flue gas/fuel mixture 73.

The oxygen in this flue gas/air mixture 73 is fully converted, mostly to carbon monoxide (CO), in the pre-combustion zone 72, consuming part of the secondary fuel gas. The oxygen-depleted flue gas/fuel mixture 73 leaving the pre-combustion zone 72 is transferred through the ejector straight extension piece, before leaving the ejector block 65. After leaving the extension piece, the oxygen-depleted flue gas/fuel mixture 73 is mixed with the remaining combustion air 6 in the main combustion zone 74. Here all the secondary fuel is converted to flue gas 75. The flue gas produced is partly recirculated back to the suction chamber of the ejector block and the nett flue gas 75 is transferred to the firebox exit 43.

The primary fuel 56 and the secondary fuel 70 can both be in operation at the same time, but need not. Secondary fuel gas 70 and compressed air 90 are preferably in operation simultaneously.

Figure 4:
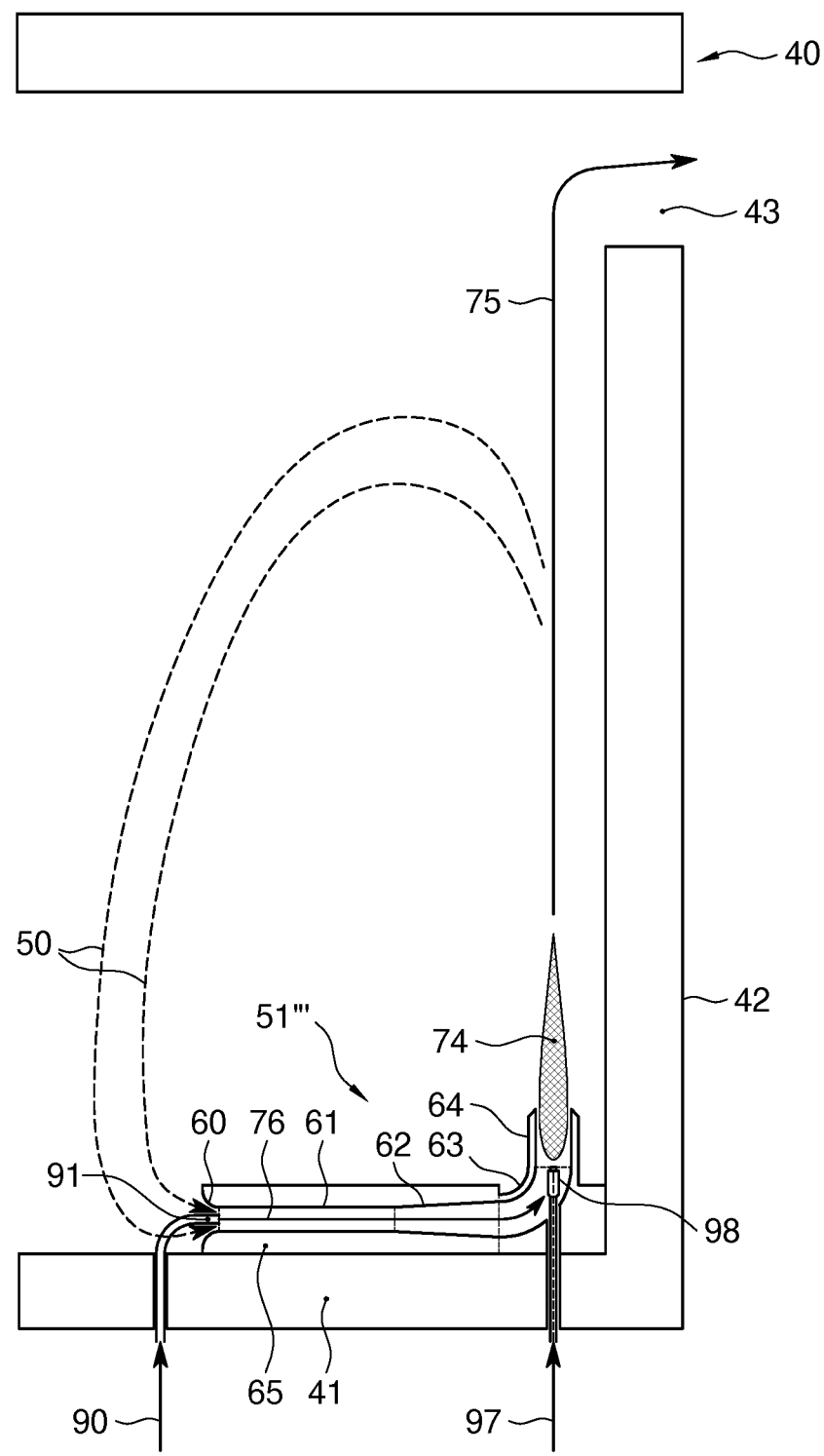
FIG. 4 shows a schematic representation of a fourth embodiment of a burner system according to the invention.

FIG. 4 shows a schematic representation of a fourth embodiment of a burner system according to the invention. The burner system 51''' according to this fourth embodiment can comprise one or more of the previously described features. The geometry of this burner system is substantially different from the previously described embodiments in that this fourth embodiment is an example of a burner system without a separate burner block 55, such that the ejector block 65 directly ejects into the firebox 40 via a single outlet of the burner system. Also, the windbox is absent in this embodiment. Further, compressed oxygen is used as a propellant in the ejector instead of compressed air or secondary fuel. The oxygen does not need to be 100% pure oxygen. It can contain considerable amounts of air as well, or even be compressed air. The compressed oxygen as propellant can at the same time provide the oxidant to the burner system, so there is no separate oxidant inlet, the oxidant inlet being the same as the propellant inlet. The burner system also comprises a main fuel burner nozzle 98 located near the outlet of the burner system, preferably in the ejector outlet bend piece 63, more preferably in or past an entrance of the ejector straight extension piece 64, to prevent overheating of the ejector block. In this case, the nozzle might actually even extend into the straight extension piece, such that the flame doesn't touch the wall, because in this case the flame is hotter than in the other cases. The main fuel burner nozzle 98 is fluidly connected with a main fuel inlet extending through the ejector outlet bend piece 63, and through the firebox floor 41. In this embodiment of the burner system, a ratio of a throat inner diameter of the ejector constant area mixing section 61 over a diameter of the first nozzle 91 is preferably higher than 10, and more preferably around approximately 20.

A compressed oxidant 90, such as compressed combustion oxygen or compressed air, can pass through the firebox floor 41 and through the compressed oxidant nozzle 91 located in the entrance of the constant-area mixing section of the ejector block 61, where it enters the ejector block 65. The recirculated flue gas 50 is propelled into the ejector block through the ejector suction chamber 60 by the high velocity jet created at the exit of the compressed oxidant nozzle by the compressed oxidant, called the propellant in this context, leaving the nozzle. The flue gas/oxidant mixture 76 is transferred through the ejector constant-area mixing section 61, the ejector diffuser 62, the ejector outlet bend 63 towards the ejector straight extension piece 64, where it is mixed with the main fuel 97, which passes through the firebox floor 41, the wall of the ejector outlet bend 63 and through the main fuel burner nozzle 98 located in or past the entrance of the ejector straight extension piece 64, where the main fuel 97 enters the ejector block 65. This main fuel gas 97 is ignited upon mixing with the mixture 76 of compressed oxidant/recirculated flue gas, coming from the ejector outlet bend 63, near the outlet of the burner system and near the main combustion zone 74 to create flue gas 75. So, there is no pre-combustion zone 72 in the ejector block 65. The produced flue gas is partly recirculated back to the suction chamber of the ejector block and the nett flue gas 75 is transferred to the firebox exit 43. Main fuel gas 97 and compressed oxidant 90 are in operation simultaneously. Due to the high amount of premixing of flue gas and oxidant, the percentage of oxygen in the flue gas/oxidant mixture is reduced to a level that is similar or even lower to that in normal combustion air. This reduces the combustion temperature in the main combustion zone considerably. This, in combination with very low nitrogen levels in the recirculating flue gas inside the firebox, reduces the NOx to extremely low values. However, the main purpose of this case is to prevent external flue gas recirculation. The intention is to recirculate enough flue gas to bring the flame temperature to conditions that are normally achieved during combustion with air. Since there is practically no nitrogen present, the NOx emission will be very low in this case any way. An additional advantage of this embodiment is that the flue gas generated is relatively rich in CO2, making it a suitable waste stream for carbon capturing, thus reducing the emission of greenhouse gases into the atmosphere.

Figure 5:
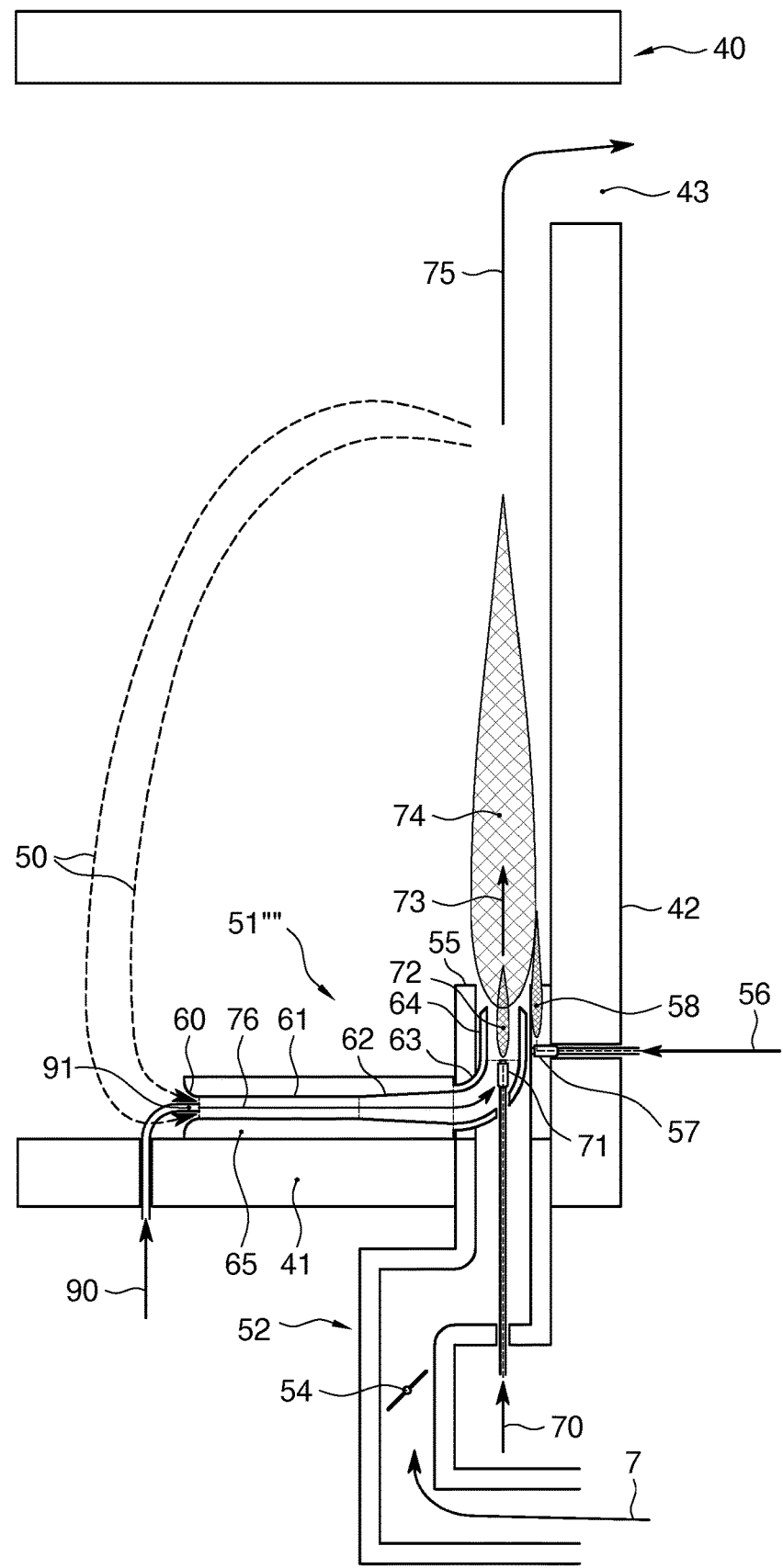
FIG. 5 shows a schematic representation of a fifth embodiment of a burner system according to the invention.

FIG. 5 shows a schematic representation of a fifth embodiment of a burner system according to the invention. The geometry of this burner system is substantially the same as in the third embodiment shown in FIG. 3. The difference lies in the use of a compressed oxidant 90 as a propellant. The compressed oxidant 90 can be air, but also oxygen and any combination of air and oxygen. Moreover, instead of using combustion air as a combustion oxidant 6, combustion air can be mixed with externally recirculated flue gas to additionally cool the flame temperature in the main combustion zone 74 in the firebox 40. The combustion oxidant 6 is mixed with externally recirculated flue gas prior to reaching the individual burner, for example in an upstream ducting (not shown). The mixture 7 of combustion oxidant/externally recirculated flue gas can enter the burner system 51'''' through the windbox 52. The flow rate of the mixture 7 can be controlled by the oxidant control damper 54 located on the windbox 52. The oxidant can travel through the oxidant channel on the inside of the windbox, through the furnace floor 41 and an inside of the burner block 55 towards the primary combustion zone 58 and the main combustion zone 74 at the outlet of the burner system.

Primary fuel gas 56 can pass through the firebox side wall 42 and through the primary fuel burner nozzles 57 located in a recess in the burner block 55, where it enters the burner block 55 and is ignited upon mixing with combustion oxidant to create flue gas in the primary combustion zone 58. If only the primary burner nozzles 57 are in operation, the majority of the flue gas 75 leaves the firebox 40 through the firebox exit 43. Flue gas recirculation is very limited in this case.

Compressed oxidant 90 can pass through the firebox floor 41 and through the compressed oxidant nozzle 91 located in the entrance of the constant-area mixing section 61 of the ejector block 65, where it enters the ejector block 65. The recirculated flue gas 50 is propelled into the ejector block 65 through the ejector suction chamber 60 by the high velocity jet created at the exit of the compressed oxidant nozzle 91 by the compressed oxidant 90, called the propellant in this context, leaving the nozzle. The flue gas/oxidant mixture 76 is transferred through the ejector constant-area mixing section 61, the ejector diffuser 62, the ejector outlet bend 63 towards the ejector straight extension piece 64, where it can be mixed with secondary fuel in the pre-combustion zone 72. Secondary fuel gas 70 can pass through the wall of the windbox 52, the wall of the ejector outlet bend 63 and through the secondary fuel burner nozzle 71 located in the entrance of the ejector straight extension piece 64, where it enters the ejector block 65. This secondary fuel gas 70 is ignited upon mixing with the recirculated flue gas/oxidant mixture 76 coming from the ejector outlet bend 63, in the pre-combustion zone 72 to create an oxygen-depleted flue gas/fuel mixture 73. The oxygen in this flue gas/oxidant mixture is substantially fully converted, mostly to carbon monoxide (CO), in the pre-combustion zone 72, consuming part of the secondary fuel gas. The oxygen-depleted flue gas/fuel mixture 73 leaving the pre-combustion zone 72 is transferred through the ejector straight extension piece, before leaving the ejector block 65. After leaving the extension piece, the oxygen-depleted flue gas/fuel mixture 73 is mixed with the remaining mixture 7 of combustion oxidant and externally recirculated flue gas in the main combustion zone 74. Here all the secondary fuel is converted to flue gas 75. The produced flue gas produced is partly recirculated back to the suction chamber 60 of the ejector block and the nett flue gas 75 is transferred to the firebox exit 43.

The primary fuel 56 and the secondary fuel 70 can both be in operation at the same time, but preferably only at start-up of the burning system, before reaching an excess oxidant level below around approximately 30 vol %, more preferably below 30 vol %, in the firebox 40. After having reached said condition, the supply of primary fuel 56 can be decreased, while the secondary fuel 70 and compressed oxidant 90, being in operation simultaneously, may be increased. As the combustion temperature in the main combustion zone is considerably lower than in the primary combustion zone, less NOx is produced in this zone than in the primary combustion zone. The smaller the percentage primary fuel, the lower the NOx emission.

Figure 6:
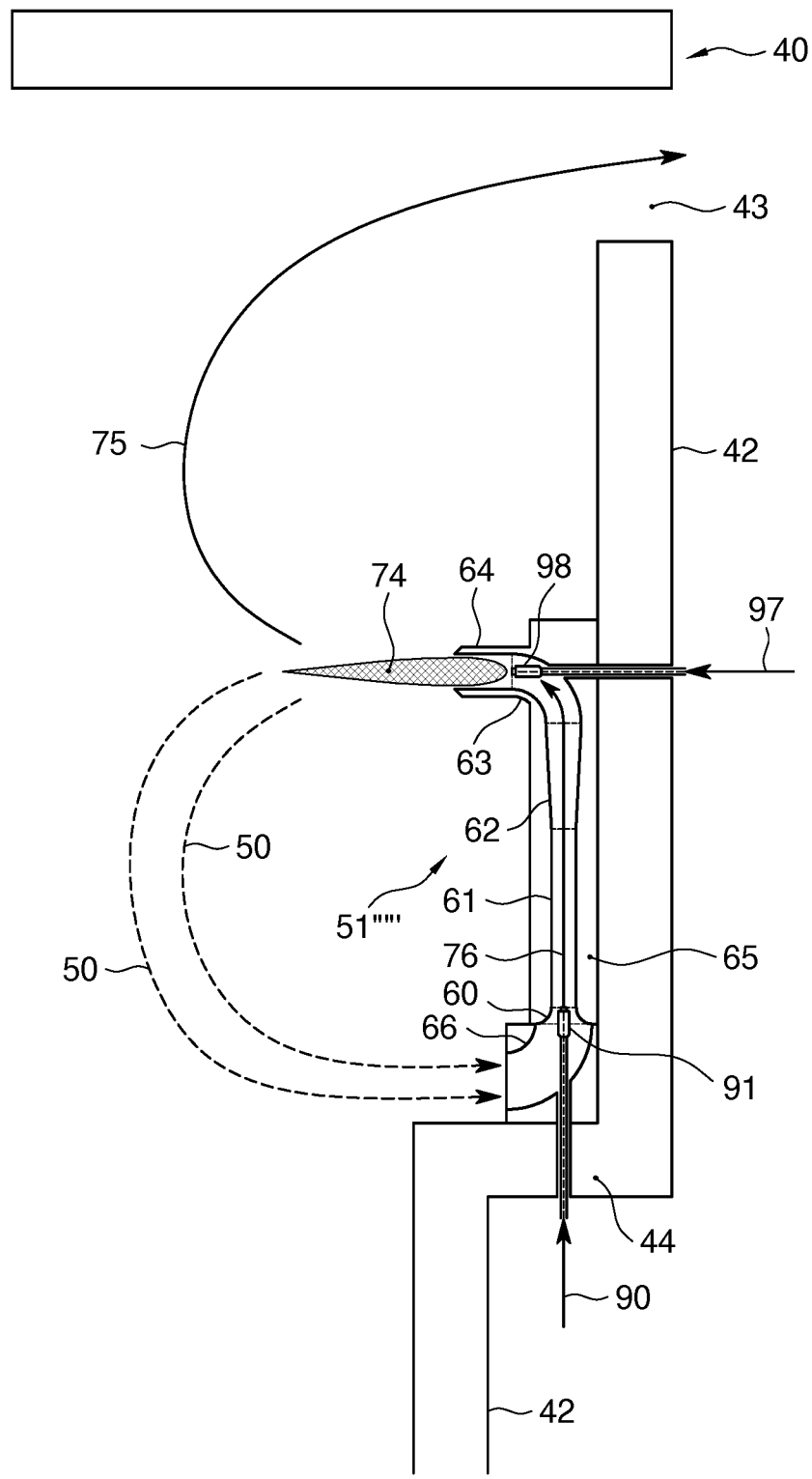
FIG. 6 shows a schematic representation of a sixth embodiment of a burner system according to the invention.

FIG. 6 shows a schematic representation of a sixth embodiment of a burner system according to the invention. The geometry of this sixth embodiment is substantially similar to that of the fourth embodiment shown in FIG. 4, but this embodiment of the burner system 51''''' is arranged to be placed along a firebox side wall 42 instead of being placed substantially horizontally on a firebox floor 41, resulting in a sideward firing. This burner system may be interesting for oxyfuel firing, which can provide a relatively small main combustion zone, such as to avoid flame impingement on radiant tubes in the firebox 40. The burner system may further comprise an ejector inlet bend piece 66 arranged to be in direct fluid communication with the ejector suction chamber 60 upstream of said suction chamber 60. Said ejector inlet bend piece 66 may be placed on a firebox floor 41 or a firebox terrace floor 44, being a substantially horizontal extension of the firebox side wall 42, either over a full circumference or only underneath the burner system. An inlet of the propellant may then extend through said firebox terrace floor 44 or firebox floor 41 and through said ejector inlet bend piece 66 to reach the first nozzle 91.

Figure 7:
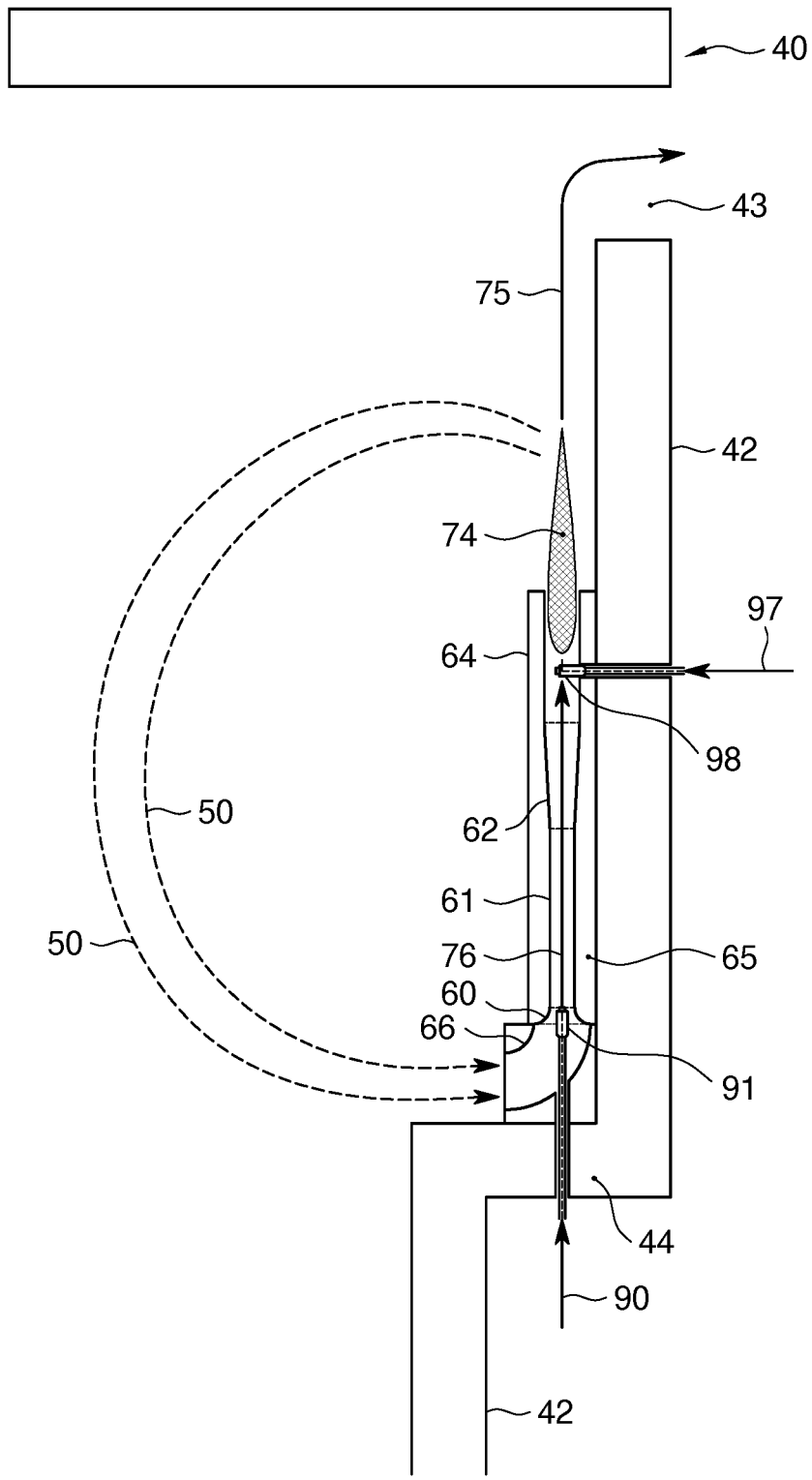
FIG. 7 shows a schematic representation of a seventh embodiment of a burner system according to the invention.

FIG. 7 shows a schematic representation of a seventh embodiment of a burner system according to the invention. In analogy with the sixth embodiment of the burner system shown in FIG. 6, the burner system shown in FIG. 7 is also arranged to be placed along a firebox side wall 42. It differs from the previous embodiment in that the burner system does not comprise an ejector outlet bend piece 63 resulting in an upward firing instead of a sideward firing. Moreover, the main fuel burner nozzle 98 extending through a side wall of the straight extension piece 64 can include a hole in its side instead of at the nozzle's end such that a combustion zone is created in an upward direction, such that larger combustion zones can be handled with this embodiment than with the sideward firing embodiment.

For the purpose of clarity and a concise description, features are described herein as part of the same or separate embodiments, however, it will be appreciated that the scope of the invention may include embodiments having combinations of all or some of the features described. As an example, even if it is not shown, the burner systems of both the embodiments of FIGS. 6 and 7, can be provided with a burner block and a windbox to allow introduction of a combustion oxidant such as air, for example mixed with externally recirculated flue gas. All of the burner systems shown can for example also be provided with staged fuel burner nozzles, as shown in FIG. 2.

It may be understood that the embodiments shown have the same or similar components, apart from where they are described as being different.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage. Many variants will be apparent to the person skilled in the art. All variants are understood to be comprised within the scope of the invention defined in the following claims.

LIST OF REFERENCE SIGNS

6. Combustion oxidant
7. Mixture of combustion oxidant and externally recirculated flue gas
40. Firebox
41. Firebox floor
42. Firebox sidewall
43. Firebox exit
44. Firebox terrace floor
50. Internally recirculating flue gas
51. Burner system
52. Windbox
53. Muffler
54. Oxidant control damper
55. Burner block
56. Primary fuel
57. Primary fuel burner nozzle
58. Primary combustion zone
60. Ejector suction chamber
61. Ejector constant area mixing section
62. Ejector diffuser
63. Ejector outlet bend piece
64. Ejector straight extension piece
65. Ejector block
66. Ejector inlet bend piece
70. Secondary fuel
71. Secondary fuel burner nozzle
72. Precombustion zone
73. Oxygen depleted flue gas/fuel mixture
74. Main combustion zone
75. Flue gas
76. Oxidant/flue gas mixture
80. Staged fuel
81. Staged fuel nozzle
90. Compressed oxidant
91. Compressed oxidant nozzle
97. Main fuel
98. Main fuel burner nozzle

The invention claimed is:

1. Burner system for a radiant section of a steam cracking furnace configured to provide heat to the radiant section, the burner system comprising:
   a fuel inlet;
   an oxidant inlet; and
   an ejector block located within the radiant section, wherein at least a portion of the ejector block is positioned above an interior facing surface of a furnace floor, and arranged to receive a propellant and a propelled fluid and arranged to premix said propellant with said propelled fluid, wherein the ejector block comprises an ejector of the constant area mixing type, wherein the ejector block includes: an ejector constant area mixing section in which the propellant and the propelled fluid are to be mixed; and an ejector diffusor in direct fluid connection with the ejector constant area mixing section from an inlet area towards a diffuser exit area being larger than the ejector diffuser inlet area, wherein the ejector constant area mixing section is at a distance from an entrance of the ejector block, wherein the burner system comprises a single outlet into the radiant section for an outlet flow of the at least partly unconverted mixture of fuel and/or oxidant combined with a propellant/propelled fluid pre-mixture, wherein the ejector block comprises a suction chamber formed at the entrance of the ejector block, which suction chamber is arranged to suck in the propelled fluid, wherein the suction chamber is arranged to increase a momentum of the propelled fluid causing the propelled fluid to first accelerate in the suction chamber along a longitudinal axis of the ejector block before being mixed with the propellant in the constant area mixing section and wherein the burner system further comprises a first nozzle configured to inject the propellant into the ejector block downstream of the ejector constant area mixing section, wherein the ejector block further comprises an ejector outlet bend downstream of the ejector diffusor and an ejector straight piece extension downstream of the ejector outlet bend such that the mixture of propellant and propelled fluid is directed into the same direction as the flow direction of the oxidant perpendicular to the longitudinal axis of the ejector block and parallel to an axis of the burner.

2. Burner system according to claim 1, wherein a ratio of a length of the ejector constant area mixing section over a throat inner diameter of the ejector constant area mixing section is in a range of about 5 to about 8.

3. Burner system according to claim 1, wherein the propelled fluid is flue gas.

4. Burner system according to claim 1, wherein the first nozzle is placed at an entrance of the ejector constant-area mixing section.

5. Burner system according to claim 1, wherein a ratio of a throat inner diameter of the ejector constant area mixing section over a diameter of the first nozzle is higher than 5.

6. Burner system according to claim 1, wherein the ejector block is configured to transfer dynamic pressure into static pressure.

7. Burner system according to claim 1, wherein a ratio of the ejector diffuser exit area over the ejector diffuser inlet area is in a range of about 1.5 to about 2.5.

8. Burner system according to claim 1, wherein the propellant is one of fuel gas, compressed air, and compressed combustion oxygen.

9. Burner system according to claim 1, wherein a ratio of a bend inner radius over a diameter of the outlet bend piece is higher than approximately 0.75.

10. Burner system according to claim 1, wherein a ratio of a length of the ejector straight piece extension over a diameter of the extension piece is higher than approximately 1.

11. Burner system according to claim 10, wherein an inside of the ejector straight piece extension exit area is tapered into a sharp edge.

12. Furnace firebox of a steam cracking furnace comprising at least one burner system according to claim 1.

13. A method, comprising, providing heat to a radiant section of a steam reformer with the burner system according to claim 1.

14. Method of operating a burner system according to claim 1, comprising:
   injecting a primary fuel and an oxidant into the burner system until reaching an excess oxidant level below approximately 30 vol %;
   decreasing a supply of primary fuel once the excess oxidant level below approximately 30 vol % has been reached;
   injecting a propellant into the ejector block.

15. Burner system according to claim 5, wherein the ratio of a throat inner diameter of the ejector constant area mixing section over a diameter of the first nozzle is higher than 7.

16. Burner system according to claim 5, wherein the ratio of a throat inner diameter of the ejector constant area mixing section over a diameter of the first nozzle is higher than 10.

17. Burner system according to claim 9, wherein a ratio of a bend inner radius over a diameter of the outlet bend piece is higher than approximately 1.

18. Burner system according to claim 10, wherein a ratio of a length of the ejector straight piece extension over a diameter of the extension piece is higher than approximately 1.5.

19. Burner system for a radiant section of a steam cracking furnace configured to provide heat to the radiant section, the burner system comprising:
   a fuel inlet;
   an oxidant inlet; and
   an ejector block located within the radiant section and arranged to receive a propellant and a propelled fluid and arranged to premix said propellant with said propelled fluid, wherein the ejector block comprises an ejector of the constant area mixing type, wherein the ejector block includes: an ejector constant area mixing section in which the propellant and the propelled fluid are to be mixed; and an ejector diffusor in direct fluid connection with the ejector constant area mixing section from an inlet area towards a diffuser exit area being larger than the ejector diffuser inlet area, wherein the ejector constant area mixing section is at a distance from an entrance of the ejector block, wherein the burner system comprises a single outlet into the radiant section for an outlet flow of the at least partly unconverted mixture of fuel and/or oxidant combined with a propellant/propelled fluid pre-mixture, wherein the ejector block comprises a suction chamber formed at the entrance of the ejector block, which suction chamber is arranged to suck in the propelled fluid causing the propelled fluid to first accelerate in the suction chamber along a longitudinal axis of the ejector block before being mixed with the propellant in the constant area mixing section, wherein the suction chamber is arranged to increase a momentum of the propelled fluid and wherein the burner system further comprises a first nozzle configured to inject the propellant into the ejector block, wherein the suction chamber includes a converging shape which converges towards the constant area mixing, and wherein the nozzle extends into the converging shape of the suction chamber along the longitudinal axis of the ejector block, wherein the ejector block further comprises an ejector inlet bend upstream of the of the ejector suction chamber and an ejector straight piece extension downstream of the ejector diffusor, wherein the fuel inlet extends into the ejector block.

20. Burner system according to claim 19, further comprising: an ejector outlet bend downstream of the ejector diffusor between the ejector diffusor and the ejector straight piece section such that the mixture of propellant and propelled fluid is directed into the burner the same direction as the flow direction of fuel, perpendicular to the longitudinal axis of the ejector block and parallel to an axis of the burner.

21. Burner system according to claim 1, wherein the fuel inlet is adjacent the ejector straight piece extension.

22. Burner system according to claim 1, wherein the first nozzle extends into the ejector outlet bend.

23. Burner system according to claim 22, further comprising a second nozzle wherein the second nozzle extends into the suction chamber along the longitudinal axis of the ejector block and at an entrance of the ejector constant-area mixing section.

* * * * *